United States Patent
Bedros et al.

(10) Patent No.: US 8,634,601 B2
(45) Date of Patent: Jan. 21, 2014

(54) SURVEILLANCE-BASED HIGH-RESOLUTION FACIAL RECOGNITION

(75) Inventors: Saad J. Bedros, West St. Paul, MN (US); Ben A. Miller, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 391 days.

(21) Appl. No.: 13/105,071

(22) Filed: May 11, 2011

(65) Prior Publication Data
US 2012/0288165 A1  Nov. 15, 2012

(51) Int. Cl.
*G06K 9/00* (2006.01)

(52) U.S. Cl.
USPC ............. 382/118; 382/115; 382/299

(58) Field of Classification Search
USPC ............ 382/115, 118, 209, 217–221, 299
See application file for complete search history.

(56) References Cited

U.S. PATENT DOCUMENTS

| 7,483,569 B2* | 1/2009 | Bhagavatula et al. ........ 382/181 |
| 2005/0018925 A1* | 1/2005 | Bhagavatula et al. ........ 382/278 |
| 2007/0098218 A1 | 5/2007 | Zhang et al. |
| 2010/0027852 A1 | 2/2010 | Hsieh et al. |

FOREIGN PATENT DOCUMENTS

| EP | 2256666 A2 | 12/2010 |
| GB | 2179222 A | 2/1987 |

OTHER PUBLICATIONS

"United Kingdom Application Serial No. 1207863.0, Combined Search and Examination Report mailed Aug. 29, 2012", 5 pgs.

* cited by examiner

*Primary Examiner* — Brian Le
(74) *Attorney, Agent, or Firm* — Schwegman, Lundberg & Woessner, P.A.

(57) ABSTRACT

Various embodiments illustrated and described herein include at least one of systems, methods, and software that utilizes imagery from a single high-resolution camera to capture images, locate individuals, and provide images to a facial recognition process. Some embodiments also include prioritization and filtering that choose which captured images from a stream of images to process and when to process them when there are many images to be processed.

21 Claims, 3 Drawing Sheets

SURVEILLANCE-BASED HIGH-RESOLUTION FACIAL RECOGNITION

BACKGROUND INFORMATION

Video surveillance-based facial recognition is used in some locations to confirm identities of people in a monitored environment. However, video surveillance provides challenges. Presence of individuals and their locations need to be identified. This involves processing an image to locate a person. However, processing an image to locate a person is very processing intensive. The higher the resolution, the more data there is to process, and the processing intensity increases. To address these issues, a first stationary, wide-angle, low-resolution camera has been used to capture images to locate individuals. The low-resolution camera captures images that are processed more quickly do to a relatively small amount of data in a low-resolution image. Once an individual is located, that location is provided to a second, higher resolution, motor-driven camera that is able to articulate and acquire a higher resolution image of a located individual. The higher resolution image is then provided to a facial recognition program for recognition processing. However, the higher resolution images typically include a scene of more than just an individual's face, which is noise that must be eliminated or ignored by the facial recognition process.

DETAILED DESCRIPTION

While dual-camera video surveillance-based facial recognition systems have provided workable solutions, there have been deficiencies identified such as the added cost of procuring, installing, and maintaining multiple cameras. Further, when two cameras are used, the by the time an individual's location has been identified in an image from a low-resolution camera, the individual may have moved out of the scene or detected location or even turned their face. As a result, latency in the second, higher-resolution camera capturing an image may result in a lost opportunity. This latency, in some circumstances can result in a missed opportunity to identify a fleeting individual. In a security setting, a missed opportunity may present an exposure to trade information theft, safety of individuals, escape or admittance of a restricted individual, among other exposures.

Various embodiments illustrated and described herein include at least one of systems, methods, and software that utilizes a single high-resolution camera to capture images, locate individuals, and provide images to a facial recognition process. Some embodiments also include prioritization and filtering that choose which captured images from a stream of images to process and when to process them when there are many images to be processed.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this application to any single invention or inventive concept if more than one is in fact disclosed. The following description is, therefore, not to be taken in a limited sense, and the scope of the inventive subject matter is defined by the appended claims.

The functions or algorithms described herein may be implemented in hardware, software, or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, Applicant-Specific Integrated Circuit (ASIC), microprocessor, or other type of processor operating on a system, such as a personal computer, server, a router, or other device capable of processing data including network interconnection devices. Some embodiments implement the functions in two or more specific interconnected hardware modules or devices with related control and data signals communicated between and through the modules, or as portions of an ASIC. Thus, the exemplary process flow is applicable to software, firmware, and hardware implementations.

Figure 1:
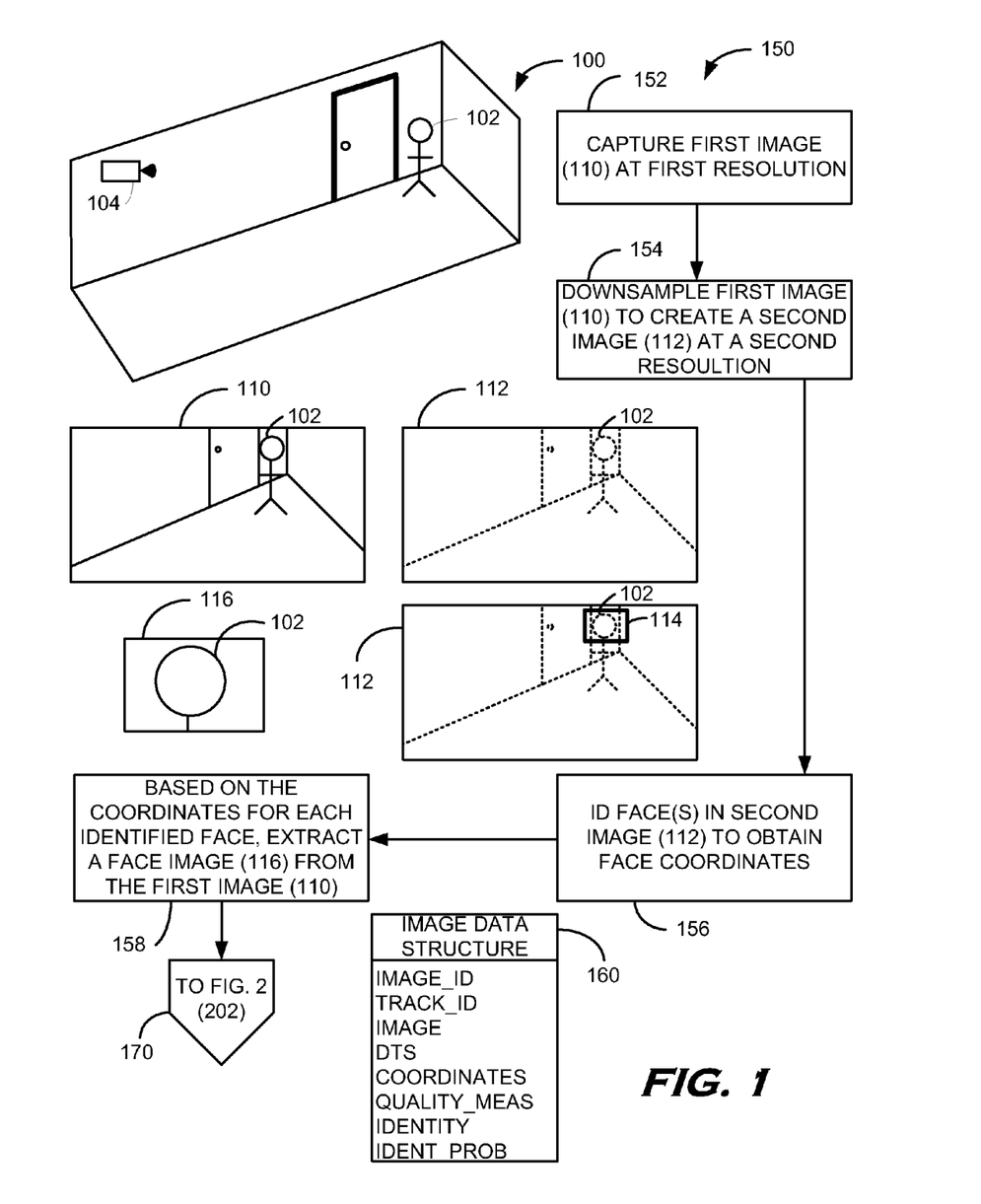
FIG. 1 is a composite illustrating including a block flow diagram of a method according to an example embodiment along with representative scene, image, and data illustrations according to example embodiments.

FIG. 1 is a composite illustrating including a block flow diagram of a method 150 according to an example embodiment along with representative scene 100, image 110, 112, 116, and data structure 160 illustrations according to example embodiments. The method 150 is a method of acquiring an image 110, processing that image to locate, isolate, and extract a facial image 116 that can be submitted to a facial recognition process.

The method 150, in some embodiments, includes capturing 152 a first image 110 acquired by a camera 104 that monitors a scene 100. The scene 100 as illustrated includes the presence of a person 102. The camera 104 may be a digital video camera or digital still image camera with suitable optics to capture images of scene as needed based on requirements for the particular embodiment and installation. In some embodiments, the optics may be adjustable to zoom and focus automatically or on command. The camera 104 may be stationary or capable of panning and tilting automatically or on command. Such adjustments to the optics and camera, when included in a particular embodiment may be made automatically based on programmed patterns of observation, in response to manually commands input into a control system, or based on commands determined by a control system based on determined environmental changes within the assigned scene 100.

The first image 110 is captured 152 at a first resolution from an image or video stream received from the camera 104. The first image 110 is generally captured at a first resolution of the camera 104; however, the first image may be at a lower resolution than the highest resolution capabilities of the camera 104. The resolution of the camera 104, and typically the resolution of the first image, is a relatively high resolution.

For example, the resolution may be one, two, four, or more megapixels in resolution. However, as imaging sensor technology, image data structure technology, and computer and graphics processor technology improves, the resolution at which the first image is captured may increase. The first image is thus captured at a high resolution relative to a second image 112, which is a lower resolution.

The second image 112 is created by downsampling 154 the first image 110 captured at the first resolution to a second resolution. The downsampling 154 may be performed according to a suitable algorithm, many of which are readily known. Downsampling algorithms typically downsize an image by an integer factor greater than one, which is typically a number of pixels of an input image to average into a single pixel of an output image. The downsampling 154 of the method 150 may be by a factor of two, four, eight, or other factoring number to result in the first image 110 to be downsampled into the second image 112.

With regard to the image 112 within FIG. 1, there are two illustrated instances of the image 112. A top and bottom instance. This is intentional as both images are the same image. However, the bottom instance is illustrated with regard to the actions of block 156 of the method 150 to illustrate identification 156 of the person's 102 face. Also with regard to the image 112, the dotted lines are intended to illustrate that the image 112 is a downsampled image at the second, lower resolution than the image 110.

Returning to the method 150, the image 112 is then processed to locate 156 one or more faces present in the image 112, if any, and to obtain face coordinates within the image 112. Referring to the bottom instance of the image 112, the face of the person 102 is located and the coordinates of the box 114 are obtained. The coordinates obtained may be coordinates of each corner of the box 114, one of the corners plus horizontal and vertical offsets defining the height and width of the box 114, or other coordinate structure defining an area where the face is located in the image 112. In some embodiments, rather than identifying box 114 as a square or rectangle, the identifying box may instead be a polygon, a circle or oval, or other shape depending on the requirements of the particular embodiment.

The method 150 continues by extracting 158 a face image 116 from the first image 110 based on the coordinates for each located face. The face image 116 includes the face of the person 102 include in the scene 100 and the captured image 110. The face image 116, being extracted 158 at from the first image 110 at the first resolution, is at the first resolution although the number of total pixels is smaller as the face image 116 is only a portion of the first image. The face image 116 may then be submitted to a facial recognition program for facial recognition processing. In response to submitting the face image 116 to the facial recognition program, data representative of an identity of the person 102 may be returned. The facial recognition program may also return an identity probability indicative of a likely accuracy of the identity.

Returning to FIG. 1 and method 150, in some embodiments, once the facial image 116 is extracted 158, the facial image 116 may be stored to an image data structure 160. The image data structure 160 may be a data structure held in memory, a database table record, data within a flat file stored in memory or other data storage device, or other structure held in a memory or data storage device. The image data structure 160 may include such data as a unique image identifier (IMAGE_ID), the facial image 116 (IMAGE), a date-time stamp of when the facial image was acquired (DTS), the coordinates of where the facial image 116 was extracted from the first image (COORDINATES), an identity from received from the facial recognition program (IDENTITY), and the identity probability received from the facial recognition program (IDENT_PROB). Some embodiments of the data structure 160 may also include other data elements, such as a track identifier (TRACK_ID) and a quality measure (QUALITY_MEAS). The purpose of the track identifier and the quality measure will be apparent as FIG. 2 is discussed below.

In some embodiments, the method 150 may be performed on each image received from the camera 104. However, as a frame rate of the camera increases, the amount of image data to be processed increases. As with most image processing, the processing involved to perform the method 150 can be intense. Further, the processing involved in facial recognition performed by the facial recognition program can be even more intense as facial recognition typically takes into account not only a facial image 116, but also identity data of known individuals that is typically stored in a database. The facial recognition program also performs various functions against a received facial image 116 to obtain feature data to compare against the identity data. Thus, the more rapid the frame rate from the camera 104, the more data processing that is required if every received image 110 is to be processed.

Figure 2:
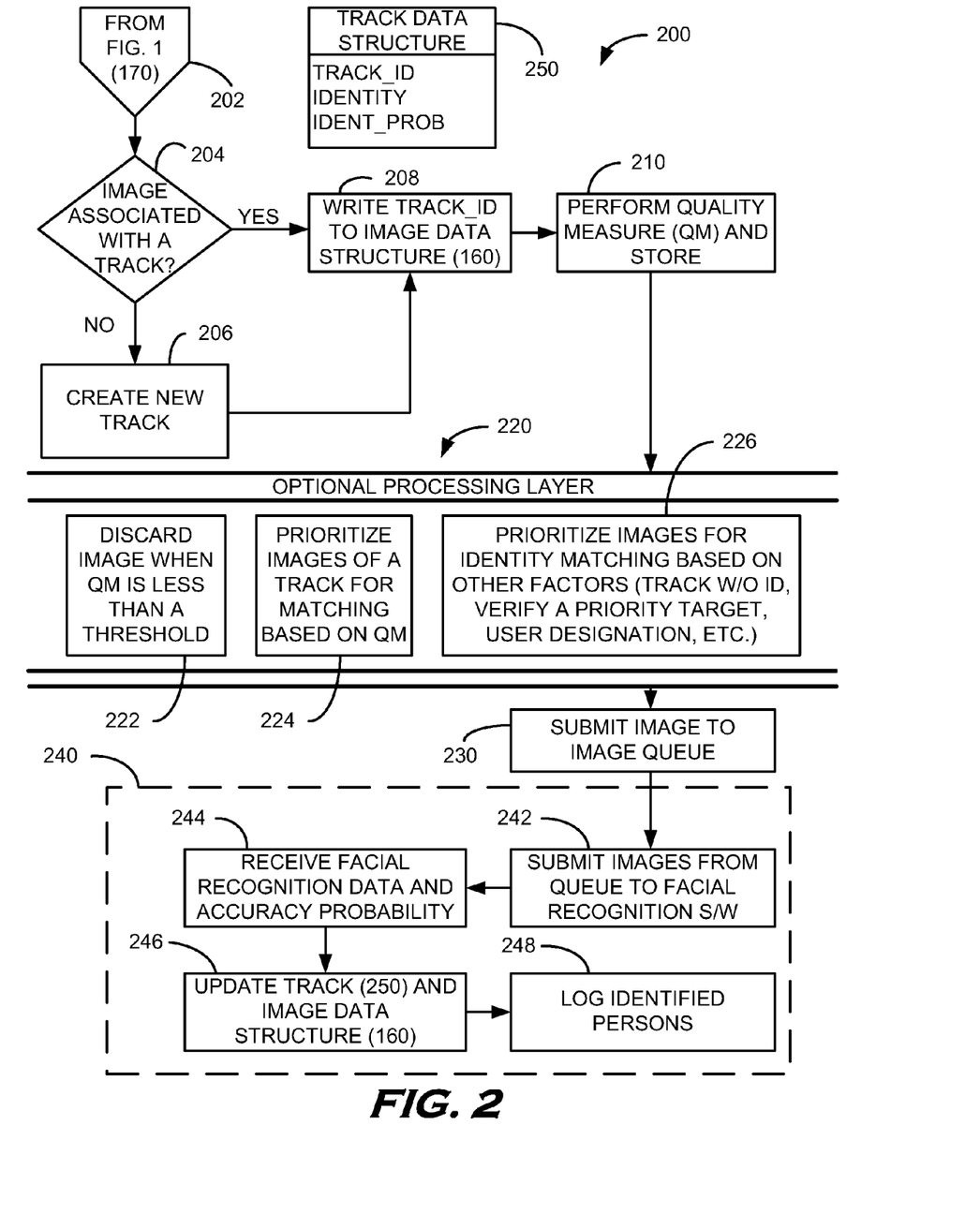
FIG. 2 is a block flow diagram of a method according to an example embodiment.

In some embodiments, rather than sending every extracted 158 facial image 116 to the facial recognition program, the method 150 of FIG. 1 connects at 170 to a method 200 illustrated in FIG. 2 at 202. FIG. 2 is a block flow diagram of the method 200 according to an example embodiment. The method 200 is a method of filtering and prioritizing facial images 116 for submission to the facial recognition program.

The method 200 includes determining 204 if the facial image 116 is associated with an existing track. A track is established and utilized to associate facial images 116 that are likely of the same individual. When multiple facial images 116 associated with a track have yet to be submitted for facial recognition, the multiple facial images 116 may be filtered, prioritized, or both filtered and prioritized in some embodiments of the method 200. Further, if multiple tracks are current in a particular scene, prioritization between tracks for submission of facial images 116 to the facial recognition program may be performed for various purposes. For example, a newly established track may be prioritized to identify the person within the track when people of other tracks have already been identified. Further, when there are multiple tracks and the people have been identified in each, a track having a lower accuracy probability may be prioritized for further facial image 116 submission to confirm the identity and increase the accuracy probability of that track. Additionally, some embodiments may prioritize facial images 116 from a track where the identified person is a priority target, is located in an unauthorized area, or other prioritization rules as may be configured. Facial images 116, in some embodiments of the method 200, may also be prioritized within and between tracks based on a quality measure applied to images to be submitted to the facial recognition programs.

Thus, as the method 200 begins with the determination 204 of whether a facial image 116 is associated with a track, examples of proximity determinations are described first followed by description of example data structures that may be used to create and store data representative of tracks.

Facial images 116 may be associated with an existing track when they are captured 152 and extracted 158 in close proximity to another facial image 116. Facial images 116 may be close in proximity both temporally and spatially.

Temporal proximity may be determined based on acquisition dates and times of facial images 116 of an existing track and a newly acquired facial image. Close in time is relative and can vary from embodiment to embodiment. However, in some embodiments, close in time may be a matter of seconds while in other embodiments, close in time may be a matter of minutes or even hours. In one example embodiment, where the scene 110 from which the first images 110 are captured 152 is a thoroughfare, such as a hallway where people typically do not remain for extended periods, temporal proximity may be configured to be a small period, such as a matter of seconds. However, in another example embodiment, where the scene 110 from which the first images 110 are captured 152 is a working area where people typically remain for extended periods, temporal proximity may be configured to be a larger period, such as a matter of minutes or perhaps even an hour or more.

Close spatial proximity is determined based on the coordinates from which the facial images 116 are extracted from respective first images 110. Close spatial proximity is also relative and can vary depending on embodiments and the size of the scene 100 of the captured 152 first images 110. However, in some embodiments, close spatial proximity may be determined based on a percentage of traversal across captured 152 first images 110, a number of pixels different between captured 152 first images 110, or other differences between coordinates. In some embodiments, as with temporal proximity, spatial proximity may vary depending on the embodiment and the monitored scene 100. For example, where the scene 110 from which the first images 110 are captured 152 is a thoroughfare, such as a hallway where people move through, spatial proximity may require a subsequent image to be a certain distance from a previous image. However, where a scene 110 from which the first images 110 are captured 152 is a work area where people move about the entire scene, spatial proximity may not be considered or a large area may be utilized.

The determination 204 of whether a facial image 116 is associated with a track, in some embodiments, includes consideration of data stored in a track data structure 250. The track data structure 250 may be a data structure held in memory, a database table record, data within a flat file stored in memory or other data storage device, or other structure held in a memory or data storage device. As illustrated, the track data structure 250 is a relational data structure related to zero to many image data structures 160 as illustrated in FIG. 1. The track data structure 250 includes a unique track identifier (TRACK_ID) that is referenced in zero to many image data structures 160 when a facial image 116 (IMAGE) of an image data structure 160 is determined 204 to be associated with a track of a track data structure 250. The track data structure 250 may also include an identity (IDENTITY) and an identity probability of accuracy (IDENT_PROB) that is determined based on the identities (IDENTITY) and identity probabilities (IDENT_PROB) of one or more image data structure 160 records.

Returning now to the illustrated elements of the method 200, in some embodiments, the determination 204 of whether a facial image 116 is associated with a track includes comparing date-time stamp (DTS) and coordinate data (COORDINATE) of image data structure 160 records associated with track data structure 250 records. When a newly acquired facial image 116 is determined 204 to NOT be associated with an existing track, a new track is created 206 by inserting a new track data structure 250 record and the TRACK_ID of the newly create track is written 208 to the image data structure record 160 of the newly acquired facial image 116. When a newly acquired facial image 116 is determined 204 to be associated with an existing track, the TRACK_ID of the associated track data structure 250 record is written 208 to the image data structure 160 record of the newly acquired facial image 116.

Next, a quality measure is applied 210 to the facial image 116. A quality measure is a measure of the fitness of the facial image 116 for performance of facial recognition. The quality measure evaluates various features of the facial image 116 such as image sharpness, an amount of present texture in the image, and image brightness. The quality measure may also evaluate various feature of the subject's face included in the image, such as openness of eyes and degrees of deviation from a frontal pose. The various features are evaluated and a score may be assigned to each factor or a composite score may be assigned. In some embodiments, each factor is scored and a composite score is generated. The quality measure score or scores, depending on the embodiment, may then be stored, such as to a record of the image data structure 160 of the facial image 116. The quality measure scores may be numeric, alphabetical, or some other data type. A best quality measure may be a high value or a low value depending on the particular embodiment.

The method 200, as illustrated, includes an optional processing layer 220. The optional processing layer 220 includes three processing elements that filter or prioritize facial images 116 for submission to a facial recognition program. Although three processing elements are illustrated in the optional processing layer, not all processing elements may be present in an embodiment. Further, in some embodiments, there may be other filtering and processing elements present in the optional processing layer 220. Additionally, the characterization of the optional processing layer 220 as optional is intended to reflect flexibility between various embodiments and does not necessarily require that filtering and processing elements are necessarily optional or not required in some embodiments.

The processing elements of the optional processing layer 220, according to the illustrated embodiment, include a processing element that discards 222 images when the quality measure of a facial image 116 is less than a threshold value. The threshold value may be a set value or a configured value. When a facial image 116 does not meet the threshold quality measure value, the facial image 116 is deemed not fit for submission to the facial recognition program. A facial image 116 that is not fit for submission to the facial recognition program is a facial image 116, which if submitted, is unlikely to provide a useful or credible outcome. Thus, when the quality measure threshold is not met, the facial image 116 may be discarded. Discarding a facial image 116 may include deleting the facial image 116, removing a record from the image data structure 160, marking an image data structure 160 record for deletion, or otherwise removing the facial image 116 from processing within the method 200 and preventing the facial image 116 from being submitted to the facial recognition program.

The processing elements of the optional processing layer 220, according to the illustrated embodiment, also include a processing element that prioritizes 224 images of a track for matching based on the quality measure. As facial images 116 that are not filtered within the optional processing layer 220 flow out of the optional processing layer 220, they may be placed in a queue for submission to the facial recognition program. In some such embodiments, the facial images 116 placed in the queue may have a priority assigned to them. This priority in some embodiments is assigned based on a comparison of quality measure values of facial images 116 associated with a track that have not yet been submitted to the facial recognition program. Thus, facial images 116 that are the most fit for facial recognition processing will be submitted first.

In some embodiments, facial images 116 of a track within the queue of images to be submitted to the facial recognition program may be prioritized 226 over facial images 116 associated with other tracks. Track prioritization 226 may be performed for various reasons as may be designated or configured in various embodiments. For example, track prioritization 226 may be performed for tracks that do not yet have identity data from the facial recognition program. In some embodiments, a track may be prioritized when the track is associated with a person's identity that is identified as a priority target or as an unauthorized person for the scene location where the facial image 116 was captured. Track prioritization 226 may also be performed for other reasons, such as a user designation with regard to particular individuals or groups of individuals.

Following processing of the optional processing layer 220, the method 200 includes submitting 230 the facial image 116 to the facial image queue. In some embodiments, submitting 230 the facial image 116 to the queue may include removing and reordering facial images 116 within the queue awaiting submission to the facial recognition program based on processing outcomes within the optional processing layer 220.

Some embodiments, of the method 200 further include queue processing 240. The queue processing 240 includes submitting 242 images from the queue to the facial recognition program and receiving 244 facial recognition data in response. The facial recognition data may vary between facial recognition programs implemented with the method 200. However, the received 244 facial recognition data typically includes data indicative of an identity of a person of the facial image 116 submitted, if an identity is found by the facial recognition program. The received 244 facial recognition data may also include an accuracy probability of the performed facial recognition. The accuracy probability is indicative of the likelihood the facial recognition accurately associated an identity with the processed facial image 116.

The queue processing 240 further includes updating 246 the track data structure 250 and the image data structure 160. Updating the image data structure includes adding the received 244 identity and accuracy probability data to the respective image data structure record. In some embodiments, the queue processing 240 may also include logging 248 identified persons to a log file, logging database table, or other data structure or location. The logging database table in some such embodiments may be a table within a corporate management database, such as a table of an Enterprise Resource Planning (ERP) application that maintains such log files in association with employee records. Some embodiments may also include monitoring the received facial recognition data for persons identified based on watch rules, lists of authorized and unauthorized individuals, matching algorithms to match a recognized identity received 244 from the facial recognition program with an identity of presented electronic credentials at a sensor, and other monitoring rules and parameters. Such monitoring rules and parameters, if violated, may trigger a system performing the queue monitoring 240 to trigger an alarm, send a message such as an email or text message to a person or other system, activate particular building control systems, and the like.

The facial recognition program is a program that operates to receive a digital image including a face and to respond with an identity of an individual matching the face from the received image. A facial recognition program typically compares facial features from the received image with a facial database. The facial database typically includes a database of known facial feature landmarks of a known subject faces. Such feature landmarks may include relative positions, sizes, and shapes of eyes, nose, cheekbones, jaw, facial scars, and other potential feature. The facial recognition program may operate by performing the comparisons according to one or more of various facial recognition algorithms, such as Linear Discriminate Analysis, Hidden Markov Model, Principle Component Analysis with eigenface, dynamic link matching, Elastic Matching, skin texture analysis, among others. An example of a facial recognition program is FaceIt® available from L-1 Identity Solutions, Inc. of Stamford, Conn.

Figure 3:
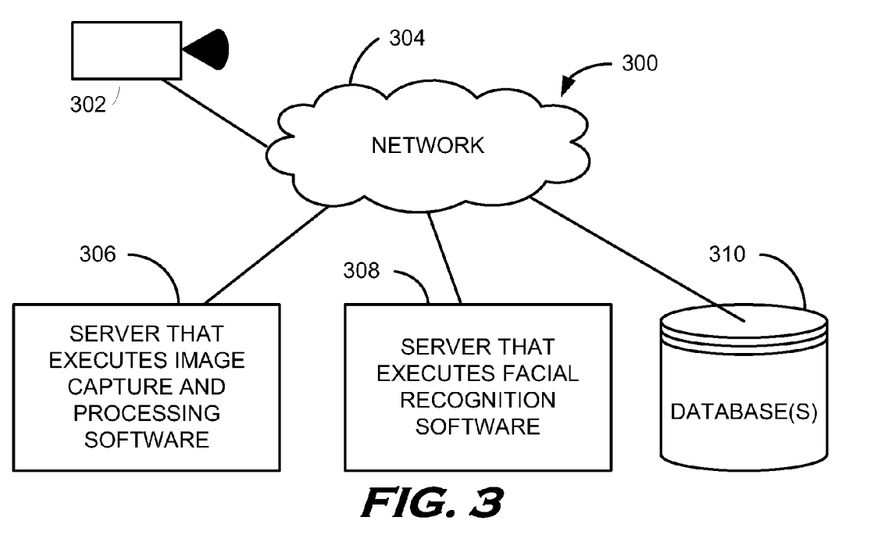
FIG. 3 is a logical block diagram of a system according to an example embodiment.

FIG. 3 is a logical block diagram of a system 300 according to an example embodiment. The system 300 is an example of a system upon which the methods 150 and 200 may be implemented for facilitating and implementing facial recognition. The system 300 includes a camera 302 that is connected to a network 304. Also connected to the network are one or more computing devices that operate server process and database 310 systems. One particular server 306 executes image capturing and processing software, such as software that implements one or both of the methods 150 and 200. The same server 306 or one or more other servers 308 execute facial recognition software. The one or more servers 308 that execute the facial recognition software may reside on an internal network 304 of an entity implementing the system 300. However, in some embodiments, the facial recognition software that executes on the one or more servers 308 may be accessible as a service over a private network, such as a virtual private network (VPN), or public network, such as the Internet.

In operation, the server 306 receives digital images or a stream of digital video from the camera 302 over the network 304. The server 306 receives the images or video stream in a first resolution, including a first image, which is at a relatively high resolution as discussed above. The server 306 software further executes to downsample an entirety of the first image to create a second image at a second resolution lower than the resolution of the image as received from the camera 302. Next the server 306 software executes to search the second image to identify faces present in the second image and identifying coordinates within the second image of areas where each identified face is located. A portion of the first image is then extracted to obtain a facial image 116 for each face identified in the second image based on the coordinates of the respective identified faces. At this point, the server 306 software may cause the facial images 116 to be submitting each facial image 116 to the server 308 that executes the facial recognition software.

Figure 4:
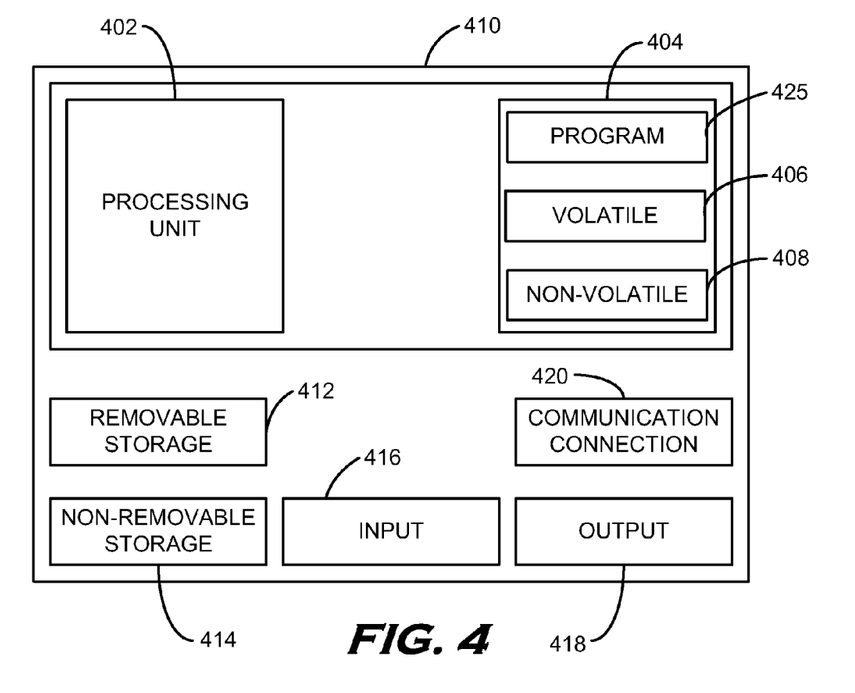
FIG. 4 is a block diagram of a computing device according to an example embodiment.

FIG. 4 is a block diagram of a computing device according to an example embodiment. In one embodiment, multiple such computer systems are utilized in a distributed network to implement multiple components in a transaction-based or service-oriented environment. For example, the computing device of FIG. 4 may be one or both of the servers 306, 308 of FIG. 3.

An object-oriented, service-oriented, or other architecture may be used to implement such functions and communicate between the multiple systems and components. One example computing device in the form of a computer 410, may include at least one processing unit 402 which includes at least one processing core, memory 404, removable storage 412, and non-removable storage 414. Memory 404 may include volatile memory 406 and non-volatile memory 408. Computer 410 may include-or have access to a computing environment that includes-or have access to a computing environment that includes-a variety of computer-readable medium, such as volatile memory 406 and non-volatile memory 408, removable storage 412, and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include a camera that connects directly to the computer 410 or camera that provides a video stream via another connection such as the communication connection 420 over a computer network. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), a System Area Network (SAN), the Internet, or other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of performing one or more of the methods illustrated and described herein, or at least a portion thereof, may be encoded as a computer processor executable instruction set stored on a computer-readable medium.

Other embodiments may be in the form of a system. The system in such embodiments includes at least one processor, at least one memory device, and at least one network interface device. Such embodiments typically include instructions stored on the at least one memory device that are executable by the at least one processor. The instructions may defining modules such as a scene analyzer module, a quality filter and prioritizing module, and a recursion module.

The scene analyzer module may be operable to receive, via the network interface device, a first image at a first resolution from a video stream originating from a camera. The scene analyzer module may further downsample an entirety of the first image to create a second image at a second resolution, the second resolution being a lower resolution than the first resolution. Next, the scene analyzer module searches the second image to identify faces present in the second image and identifying coordinates within the second image of areas where each identified face is located. Subsequently the scene analyzer module extracts a portion of the first image to obtain a facial image for each face identified in the second image based on the coordinates of the respective identified faces. Finally the scene analyzer module associates the facial image with a track that is close in proximity to the facial image, the track including a plurality of facial images.

The quality filter and prioritizing module, in some embodiments, applies a quality measure to each facial image of the track prior to submission to a facial recognition program to obtain a quality measure value for each facial image. The quality filter and prioritizing module further filters and prioritizes the facial images of the track amongst facial images of other tracks based on facial image quality measure values.

The recursion module that prioritizes facial images within a queue of facial images awaiting processing by the facial recognition program based on at least one queue prioritization rule. In some embodiments, the at least one queue prioritization rule includes a queue prioritization rule that prioritizes facial images based on a number of facial images associated with a track that have been previously processed by the facial recognition program.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    capturing a first image at a first resolution from a video stream originating from a camera;
    downsampling an entirety of the first image to create a second image at a second resolution, the second resolution being a lower resolution than the first resolution;
    searching the second image to identify faces present in the second image and identifying coordinates within the second image of areas where each identified face is located;
    extracting a portion of the first image to obtain a facial image for each face identified in the second image based on the coordinates of the respective identified faces;
    submitting each facial image to a facial recognition program and receiving identity data in response thereto.

2. The method of claim 1, further comprising:
    applying a quality measure to each facial image prior to submission to the facial recognition program to obtain a quality measure value for each facial image; and
    discarding facial images without submitting them to the facial recognition program when the quality measure value is below a threshold.

3. The method of claim 2, wherein the quality measure obtains the quality measure value based on measured properties of the facial image including a set of factors comprising:
    image sharpness;
    openness of eyes;
    degrees of deviation from a frontal pose;
    an amount of present texture; and
    brightness.

4. The method of claim 2, further comprising:
    storing a facial image in an image data structure, the data structure including data elements to be populated including:
        the facial image;
        the coordinates of the identified face;
        the quality measure value; and
        the identity data, the identity data including a facial recognition accuracy value.

5. The method of claim 4, further comprising:
    a track data structure including at least one associated image data structure;
    determining a new facial image data structure is associated with a track of the track data structure based on a proximity of the coordinates of the new facial image data structure to the coordinates of at least one of the at least one associated image data structure associated with the track data structure; and
    associating the new facial image data structure with the track data structure.

6. The method of claim 1, wherein the video stream is received from the camera via a network.

7. The method of claim 1, wherein facial images are submitted to and the identity data is received from the facial recognition program over a network.

8. The method to claim 1, wherein the downsampling is performed by a factor of at least four (4).

9. A non-transitory, computer-readable medium with instructions stored thereon, which when executed by at least one processor of a computing device, causes the computing device to perform actions comprising:
   capturing a first image at a first resolution from a video stream originating from a camera;
   downsampling an entirety of the first image to create a second image at a second resolution, the second resolution being a lower resolution than the first resolution;
   searching the second image to identify faces present in the second image and identifying coordinates within the second image of areas where each identified face is located;
   extracting a portion of the first image to obtain a facial image for each face identified in the second image based on the coordinates of the respective identified faces;
   submitting each facial image to a facial recognition program and receiving identity data in response thereto.

10. The non-transitory, computer-readable medium of claim 9, with further instructions stored thereon, which when executed by the at least one processor of the computing device, causes the computing device to perform further actions comprising:
    applying a quality measure to each facial image prior to submission to the facial recognition program to obtain a quality measure value for each facial image; and
    discarding facial images without submitting them to the facial recognition program when the quality measure value is below a threshold.

11. The non-transitory, computer-readable medium of claim 10, wherein the quality measure obtains the quality measure value based on measured properties of the facial image including a set of factors comprising:
    image sharpness;
    openness of eyes;
    degrees of deviation from a frontal pose;
    an amount of present texture; and
    brightness.

12. The non-transitory, computer-readable medium of claim 10, with further instructions stored thereon, which when executed by the at least one processor of the computing device, causes the computing device to perform further actions comprising:
    storing a facial image in an image data structure, the data structure including data elements to be populated including:
    the facial image;
    the coordinates of the identified face;
    the quality measure value; and
    the identity data, the identity data including a facial recognition accuracy value.

13. The non-transitory, computer-readable medium of claim 12, with further instructions stored thereon, which when executed by the at least one processor of the computing device, causes the computing device to perform further actions comprising:
    storing a track data structure including at least one associated image data structure;
    determining a new facial image data structure is associated with a track of the track data structure based on a proximity of the coordinates of the new facial image data structure to the coordinates of at least one of the at least one associated image data structure associated with the track data structure; and
    associating the new facial image data structure with the track data structure.

14. The non-transitory, computer-readable medium of claim 13, with further instructions stored thereon, which when executed by the at least one processor of the computing device, causes the computing device to perform further actions comprising:
    generating a new track data structure when the new facial image data structure is not associated with the track data structure; and
    associating the new facial image data structure with the new track data structure.

15. A system comprising:
    at least one processor, at least one memory device, and at least one network interface device; and
    instructions stored on the at least one memory device that are executable by the at least one processor, the instructions defining modules, the modules including:
    a scene module that:
      captures a first image at a first resolution from a video stream originating from a camera;
      downsamples an entirety of the first image to create a second image at a second resolution, the second resolution being a lower resolution than the first resolution;
      searches the second image to identify faces present in the second image and identifies coordinates within the second image of areas where each identified face is located;
      extracts a portion of the first image to obtain a facial image for each face identified in the second image based on the coordinates of the respective identified faces;
      submits each facial image to a facial recognition program and receives identity data in response thereto.

16. The system of claim 15, wherein the scene module further:
    applies a quality measure to each facial image prior to submission to the facial recognition program to obtain a quality measure value for each facial image; and
    discards facial images without submitting them to the facial recognition program when the quality measure value is below a threshold.

17. The system of claim 16, wherein the quality measure obtains the quality measure value based on measured properties of the facial image including a set of factors comprising:
    image sharpness;
    openness of eyes;
    degrees of deviation from a frontal pose;
    an amount of present texture; and
    brightness.

18. The system of claim 16, wherein the scene module further:
    stores a facial image in an image data structure, the data structure including data elements to be populated including:
    the facial image;
    the coordinates of the identified face;
    the quality measure value; and
    the identity data, the identity data including a facial recognition accuracy value.

19. The system of claim 18, wherein the scene module further:

maintains a track data structure including at least one associated image data structure;

determines a new facial image data structure is associated with a track of the track data structure based on a proximity of the coordinates of the new facial image data structure to the coordinates of at least one of the at least one associated image data structure associated with the track data structure; and associates the new facial image data structure with the track data structure.

20. The system of claim 15, wherein the video stream is received from the camera via a network.

21. The system of claim 15, wherein facial images are submitted to and the identity data is received from the facial recognition program over a network.

* * * * *